Nov. 5, 1968   G. T. McCOLLOUGH ETAL   3,408,750
VISI-GOLF MODERN METHOD OF GOLF INSTRUCTION
Filed Sept. 15, 1965   4 Sheets-Sheet 1

INVENTORS
George T. McCollough &
Fred C. Edwards
BY Polachek & Saulsbury
ATTORNEYS Nov. 5, 1968  G. T. McCOLLOUGH ET AL  3,408,750
VISI-GOLF MODERN METHOD OF GOLF INSTRUCTION
Filed Sept. 15, 1965  4 Sheets-Sheet 3

MASTER DISPLAY – FRONT

INVENTORS
George T. McCollough &
Fred C. Edwards
BY
Polachek & Saulsbury
ATTORNEYS

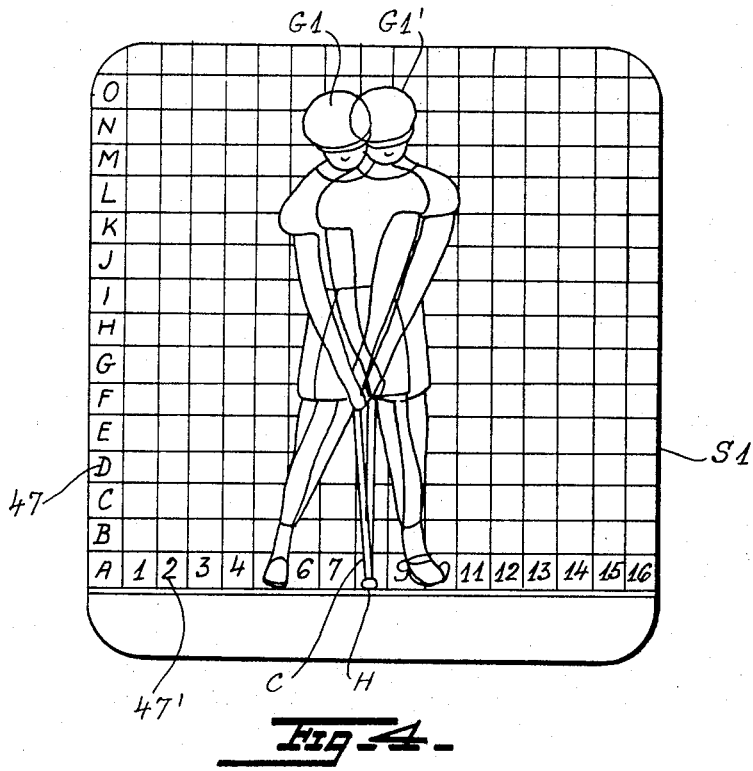
Fig. 4. DUAL DISPLAY – FRONT
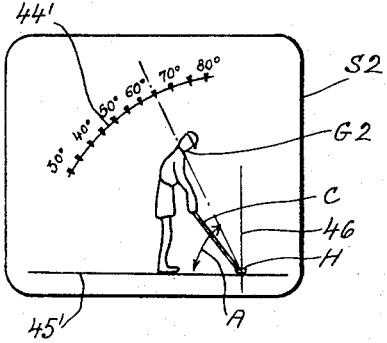
Fig. 6. MASTER DISPLAY – SIDE
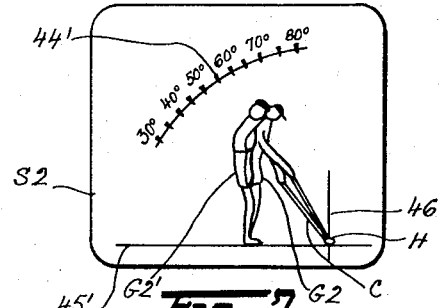
Fig. 7. DUAL DISPLAY – SIDE 3,408,750
VISI-GOLF MODERN METHOD OF
GOLF INSTRUCTION
George T. McCollough, 16644 Fielding Drive, Detroit,
Mich. 48219, and Fred C. Edwards, 1007 S. Ocean
Drive, Hollywood, Fla. 33020
Filed Sept. 15, 1965, Ser. No. 487,437
2 Claims. (Cl. 35—29)

ABSTRACT OF THE DISCLOSURE

A golf instruction system including a special grid platform on which a student golfer stands while simultaneously a picture of a master golfer is projected on a screen and the student golfer assumes a proper playing position on the grid platform while video cameras pick up his position and superimposes it on the screen, whereby the student golfer can look at this screen and reposition his golf stand to be substantially coincident with the position of the master golfer.

---

Figure 1:
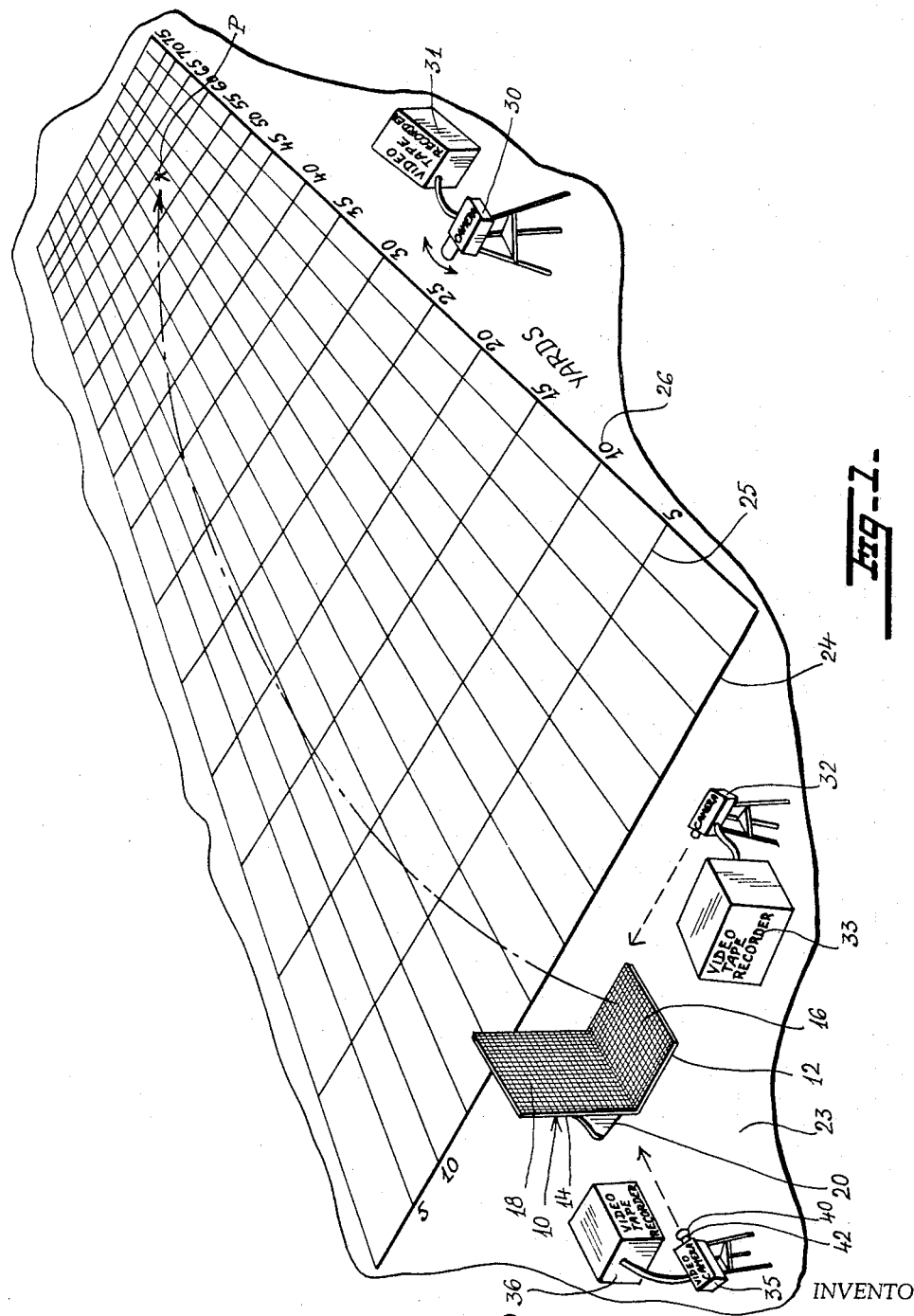

This invention concerns an improved golf instruction system.

The invention involves use of closed circuit television or video equipment and employs a special platform marked with coordinate lines in grid patterns. On this a golfer stands while the equipment is in use. According to the invention video pictures are taken and recorded on video tape while a student golfer assumes proper playing, ideal positions under the guidance of a professional instructor. Thereafter the recorded video pictures comprising the master record are played back through a video receiver or display device which may be in view of the student so that the student can attempt to duplicate his playing positions as shown on the viewing screen of the display device. The equipment may be arranged so that the student golfer is scanned by a video camera while standing on the platform. The video images of the golfer are then passed to and reproduced upon a viewing screen of a video display device at the same time that the master video record is reproduced on the viewing screen. The student golfer can thus see how his stance and movements differ from the ideal positions of the master picture record and can change his position until they correspond with those of the master record. The equipment may be provided with controls for projecting the pictures on the viewing screen as still or stopped pictures, as slow motion pictures or as normal speed pictures. Both front view and side view pictures will be taken and a master record tape will be made of each view. The master pictures taken of the side view may be taken through a lens screen having a marked scale so that certain playing positions of the golfer can be graphically shown. One or more video cameras can also be provided for scanning and recording the trajectory of struck golf balls over a playing field marked with coordinate lines so that the effects of different playing positions and strokes made by a student golfer can be recorded.

It is therefore a principal object of the invention to provide a golf instruction system including means whereby master video records can be made in side and front views of a student golfer while assuming different playing positions.

A further object is to provide a system as described, including a platform having a horizontal floor and vertical wall upon which are rectangular coordinate lined patterns.

Still another object is to provide a system as described with video cameras arranged for recording the golfer's positions on video tape, one camera which is employed for side views being provided with a lens screen having an arcuate angular scale thereon.

A further object is to provide a golf instruction system with a plurality of video scanning cameras for taking side and front views of a student golfer, and video display means for projecting images of side and front views of the golfer.

Still another object is to provide a system as last described along with master tape reproducing equipment connected to the video display means for projecting side and front images of master tape records on to the video display means while the cameras are scanning the student golfer.

A further object is to provide a new and improved method of golf instruction employing direct visual comparison of images of a golfer in various playing positions superimposed on master images of the golfer in ideal playing positions.

For further comprehension of the invention, and of the objects and advantages thereof, reference will be had to the following description and accompanying drawings and to the appended claims in which the various novel features of the invention are more particularly set forth.

Figure 2:
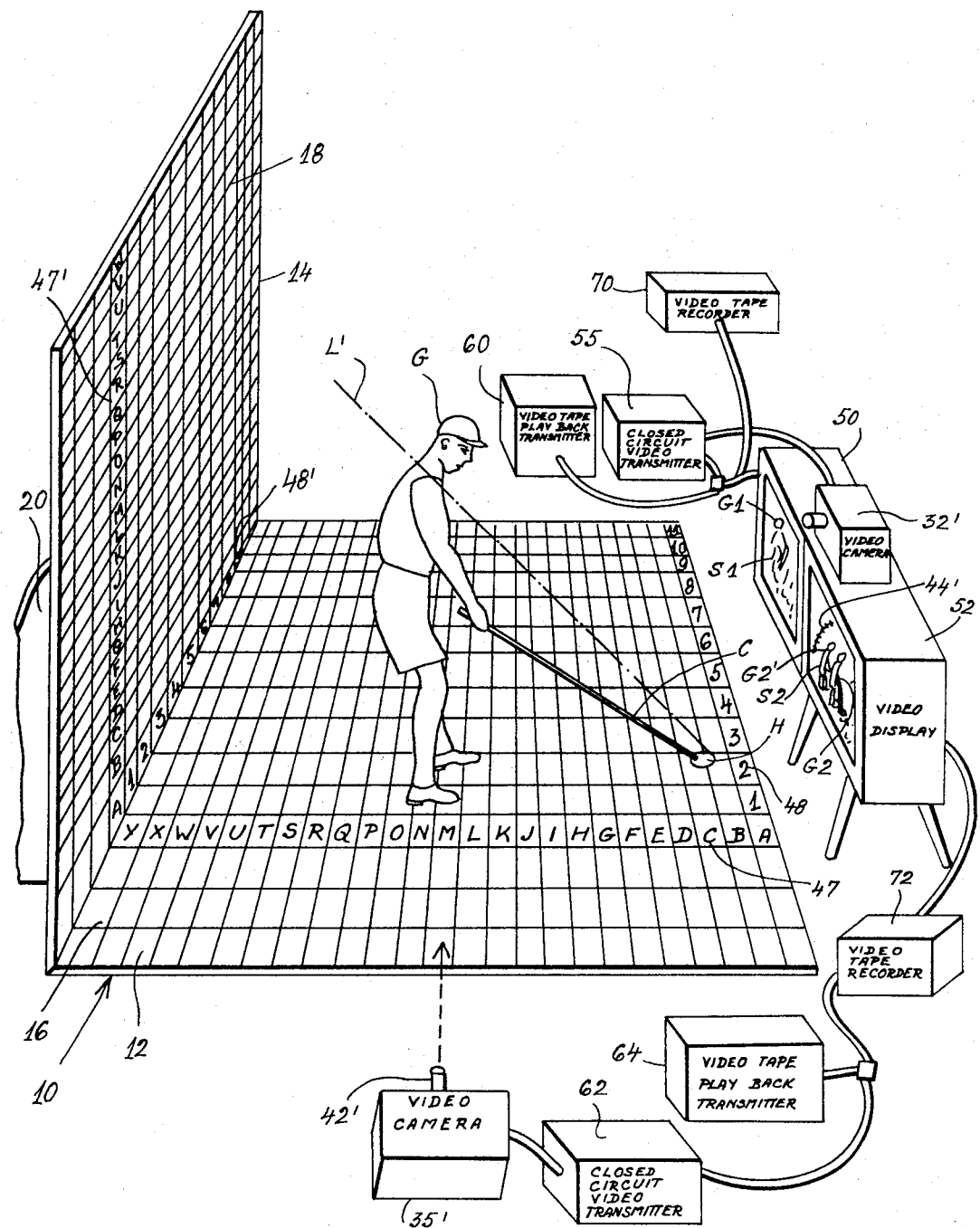
Figure 3:
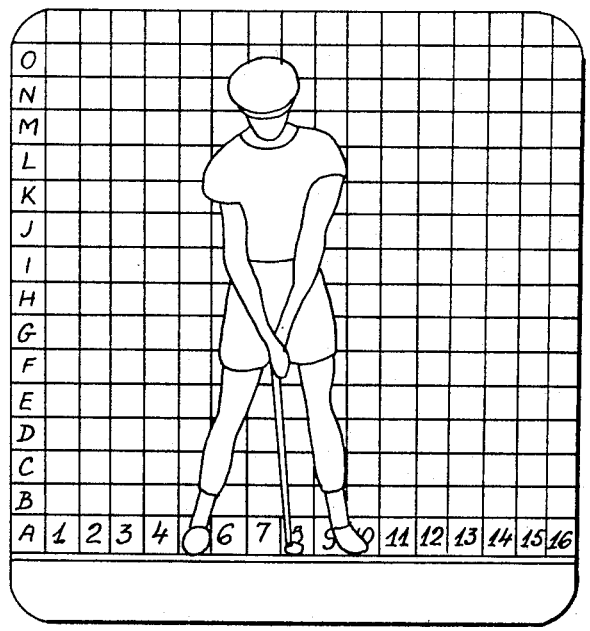
Figure 5:
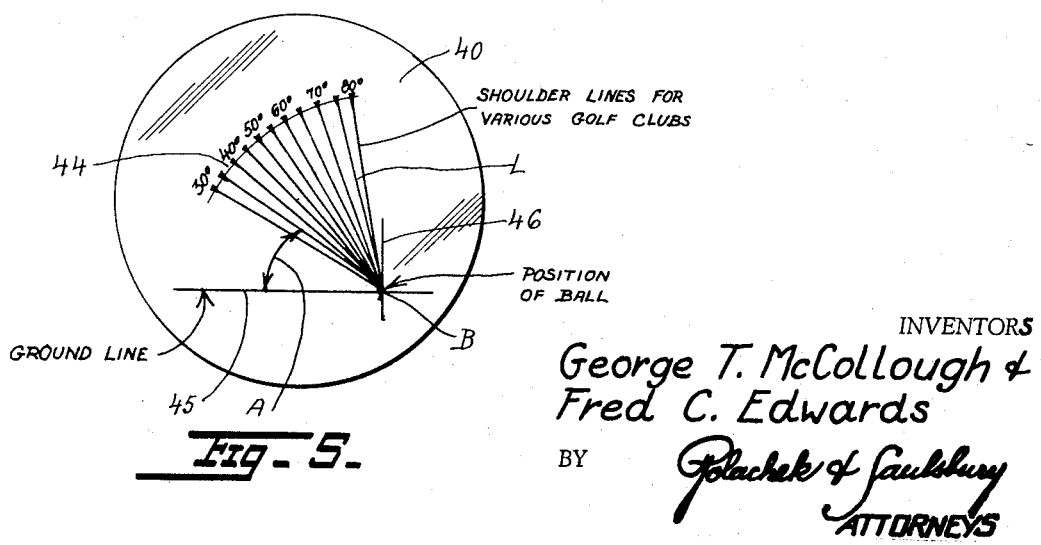

In the accompanying drawings forming a material part of this disclosure:

FIGURE 1 is a perspective view partially diagrammatic in form of apparatus employed in the golf instruction system embodying the invention, FIG. 2 is an enlarged perspective view of equipment forming parts of the system, shown in use by a student golfer, FIG. 3 is an elevational view of a master display of a front golfing position as it appears on a viewing screen of a video display device, FIG. 4 is an elevational view similar to FIG. 3, showing superimposed dual images of a front view picture as it appears on a viewing screen of a video display device, FIG. 5 is an elevational view of a lens screen employed in taking side view pictures by means of a video scanning camera, FIG. 6 is an elevational view of a master display of a side golfing position as it appears on a viewing screen of a video display device, and FIG. 7 is an elevational view similar to FIG. 6 showing superimposed dual images of side view pictures as they appear on the viewing screen of a video display device.

Referring first to FIG. 1 there are shown components of a golf instruction system disposed in operative positions. The system includes a platform 10 having a horizontal floor 12 and vertical side wall 14. Adjacent sides of the floor 12 and wall 14 have rectangular coordinate grid patterns 16 and 18 respectively thereon. A brace member 20 can be provided for holding the platform 10 in the upright position shown on floor 22 of a golf instruction field 23'. The platform is placed just in front of and centered at a rectangular grid pattern 24 marked on the driving range floor 22. Transverse lines 25 of the pattern 24 can be seen having yardage indicating markings 26. The trajectory T of a golf ball struck by a golf student standing on platform 10 may be scanned by a video camera 30 located laterally of the grid pattern 24. The camera will pass video images as electrical signals to a video tape recorder 31 which will record both the trajectory T and the landing point P of the golf ball.

Located laterally of the platform 10 facing vertical wall 14 is a video camera 32 which records the front facing position of the golf student as he stands on the floor 12 of the platform with his back to wall 14. The camera 32 passes electrical pulses to video tape recorder 33, for recording front views of the golf student.

Located forwardly of the platform 10 is a third video camera 35 which scans the right side of the golf student and passes pulses to video tape recorder 36 for recording side views of the golf student.

FIG. 5 shows a screen 40 which may be placed in front of the lens 42 of camera 35. This screen has an arcuate scale 44 inscribed thereon and marked in angular degrees numerically. The angles A are taken with respect to horizontal ground line 45, with point B located at the intersection of vertical line 46 and ground line 45. Point B represents the position of a golf ball and the several angles A represent angles between the ground line 45 and ball-to-shoulder lines L as will be explained in connection with FIGS. 6 and 7.

FIG. 2 shows platform 10 on a larger scale. The golf student G is shown standing on the floor 12 of the platform in a particular position on the grid pattern 16 as determined by orthogonal grid markings 47 and 48. Similar markings 47' and 48' appear on pattern 18 at vertical wall 14. The golfer is also oriented in a particular position with respect to the pattern 18. A pair of video display devices 50, 52 can be located in front of the golfer in his field of view so that he does not have to raise his head to see the screens S1 and S2. Video scanning camera 32' is located in front of the golf student and is connected to the video display device 50 via closed circuit video transmitter 55. Video tape playback transmitter 60 is also connected to display device 50. Transmitters 55 and 60 are also connected to video tape recorder 70.

At the right side of the golf student G forwardly of platform 10 is video camera 35' connected via closed circuit video transmitter 62 to video display device 52. Also connected to the display device 52 is video tape playback transmitter 64. Transmitters 62 and 64 are also connected to video tape recorder 72. On camera lens 42 is a screen 40 as shown in FIG. 5.

In operation of the apparatus shown in FIG. 1, a first master tape is made showing in front view images G1 of ideal proper playing positions of golfer G. FIG. 3 shows a scene or image G1 of one picture of a master tape as it would appear on viewing screen S1 of display device 50. The golf student is posed in optimum playing position. In motion he employs proper motion of backswing, leg pivot, wrists, shoulders, and downswing. This entire master tape record can be projected picture by picture as a series of still pictures or as a continuous motion picture in slow motion or in normal speed action. Image G1 includes the image of grid pattern 18.

This master record of the front view image G2 appears on display device 50 shown in FIG. 2. The golf student G will try to set up his stance to correspond with that shown by the master record projected on screen S1. To insure complete conformity with the master record, the camera 32' can be turned on and dual image projection and display will result on screen S1 as shown in FIG. 4. In addition to the master image G1 appears image G1' as scanned by camera 32'. The golfer can observe his displacement from the ideal playing position by comparing the double images G1 and G1'. Initially image G1 will be held stationary while image G1' can move until the player has assumed the perfect or ideal position when images G1 and G1' will coincide. The apparatus will preferably be used under supervision of a professional golf instructor, so that he can supplement his oral instruction with a graphic display of what the student must do. The master video tape record can be retained by a golf student or golf instructor as a record of ideal playing positions for the one student. Then the student can repeatedly check his positions and correct them to conform with the showing of the master record.

The master record made of the golfer's side view is made by means of camera 35 and recorder 36. The master image G2 as shown in FIG. 6 shows the optimum angle A between ground line image 45' and the ball-to-shoulder line L' for the particular golf club C being held by the golfer. The golfer will see this image on viewing screen S2 of display device 52 in FIG. 2. He will try to duplicate this playing position. The master record will show optimum position of the club head H and the proper position to hold the club C as well as the entire optimum posture of the golfer. The side image record will show optimum shoulder position, drawback of the club head and downswing. The apparatus of FIG. 1 will be used to make this master record. Then for practice purposes the equipment setup of FIG. 2 will be used. After the golf student G has placed himself in what he believes is ideal playing position, camera 35' can be turned on and the dual images G2 and G2' will appear as shown in FIG. 7. The master image G2 can initially be held stationary and the image G2' will move as the player tries to conform his stance with that of the master side image G2. When images G2 and G2' coincide and images G1, G1' coincide then the golfer will be in the proper playing position predetermined as optimum for him. Then images G1 and G2 can be projected in slow motion while the student closely observes the sequences of motion. The master tapes can be rewound and rerun repeatedly until the golfer is ready to swing. Then the golfer images G1 and G2 can be projected at normal speed while the golfer swings the club C. The instructor standing by will observe any deviations which occur between the ideal positions of the swing sequence and those assumed by the student.

The recorders 70, 72 can be used to make tape recordings of the dual images G1, G1' and G2, G2'. These can then be projected through display devices 50 and 52 respectively and the scenes will appear as shown in FIGS. 4 and 7 respectively so that the student can see for himself just what errors he made. He can then strive to correct errors such as "bob," "sway," "faulty pivot," "elbow bend," "off position of ball through shoulder line," etc. Graphic measurable deviations from optimum backswing, downswing, etc. will appear with respect to the background pattern 18. Similarly measurable deviations from optimum ball-shoulder line position will appear with respect to scale 44.

Thus the professional golf instructor can supplement his oral instructions with graphic demonstrations of both optimum golf playing positions and actual deviations of the golf student from the ideal optimum positions.

The record provided by recorder 31 of FIG. 1 is used to show the results of driving the golf ball using optimum playing position. This master record can be projected on a video display device like devices 50 or 52. This master record can be compared with the trajectory display obtained with a camera like camera 30 when the golfer drives the ball in a practice session using the apparatus of FIG. 2. Thus the golf student and his instructor can be completely informed at all times of the student's progress toward the ideal performance for which he is striving.

It is a feature of the present invention that the student can have available master still picture displays of himself in ideal posed positions. These he can study at leisure and has ample time to attempt to duplicate the ideal poses. Then the master still pictures can be displayed in slow motion for action study. Then the student has available action pictures of himself standing alone or in comparison with master pictures in a dual image display. Finally the dual image displays can be recorded on recorders 70 and 72 for repeated presentation as still pictures, slow motion and normal action to show the student and his instructor just where the student deviates from the ideal playing positions.

If the full length driving range 22 shown in FIG. 1 is not available it is possible to employ an indoor foreshortened driving range.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. Apparatus for visual golf playing instruction, comprising a platform having a horizontal floor and vertical back wall, rectangular grid patterns on said floor and wall respectively, video display means for projecting master video images of a master golf player on viewing screens visible to a player standing on said floor, a video camera for scanning said player in front view, another video camera for scanning said player in side view, and means connecting the cameras to the display means respectively so that the player sees himself in practice positions in front and side view respectively simultaneously while standing on said floor of the platform and a pair of video playback transmitters connected to the display devices respectively for displaying said master video images of the master player in optimum front and side views respectively simultaneously with the displays of the front and side practice position views of the player standing on the platform floor.

2. Apparatus for visual golf playing instruction, comprising a platform having a horizontal floor and vertical back, rectangular grid patterns on said floor and wall respectively, video display means for projecting master video images of a master golf player on viewing screens visible to a player standing on said floor, a video camera for scanning said player in front view, another video camera for scanning said player in side view, and means connecting the cameras to the display devices respectively so that the player sees himself in practice positions in front and side view respectively simultaneously while standing on said floor of the platform, and a pair of video playback transmitters connected to the display means respectively for master video images of the master player in optimum front and side views respectively simultaneously with the displays of the front and side practice position views of the player standing on the platform floor, further comprising video tape recorders connected to the video cameras and playback transmitters for recording said superimposed master and practice images of front and side views of the player.

References Cited

UNITED STATES PATENTS

| 1,722,935 | 7/1929 | Messter | 95—1 |
| 2,494,000 | 1/1950 | Robertson | 35—29 |
| 2,894,753 | 7/1959 | Simjian | 273—185 |
| 3,040,644 | 6/1962 | Hearther | 95—64 |
| 3,145,484 | 8/1964 | Bayley | 35—29 |
| 3,181,169 | 4/1965 | Marchal et al. | 346—1 |
| 3,293,981 | 12/1966 | Jenson | 88—24 |

FOREIGN PATENTS 7,522    1913    Great Britain.

EUGENE R. CAPOZIO, *Primary Examiner.*

H. S. SKOGQUIST, *Assistant Examiner.*